United States Patent
Poteat

(10) Patent No.: US 6,629,043 B1
(45) Date of Patent: Sep. 30, 2003

(54) MULTIPLE PORT LEAK DETECTION SYSTEM

(76) Inventor: Jere Poteat, 300 Little Creek, Leslie, MO (US) 63056

(*) Notice: Subject to any disclaimer, the term of this patent is extended or adjusted under 35 U.S.C. 154(b) by 10 days.

(21) Appl. No.: 09/676,302

(22) Filed: Sep. 29, 2000

Related U.S. Application Data

(60) Provisional application No. 60/156,832, filed on Sep. 30, 1999.

(51) Int. Cl.$^7$ .............................................. G01F 17/00
(52) U.S. Cl. ..................... 702/51; 73/863.33
(58) Field of Search ........................... 702/51; 73/49.2, 73/863.33, 31.03, 23.2

(56) References Cited

U.S. PATENT DOCUMENTS

| | | | |
|---|---|---|---|
| 4,356,721 A | * 11/1982 | White et al. | 73/40.7 |
| 4,492,110 A | * 1/1985 | Bergquist | 250/288 |
| 5,375,456 A | * 12/1994 | Burns | 73/40.7 |
| 5,535,253 A | * 7/1996 | Loisy et al. | 376/246 |
| 6,289,722 B1 | * 9/2001 | Lycan et al. | 73/40.7 |

* cited by examiner

Primary Examiner—John Barlow
Assistant Examiner—S. Cherry
(74) Attorney, Agent, or Firm—Armstrong Teasdale LLP

(57) ABSTRACT

A high precision system for adapting mass spectrometry for leak detection in high production applications is described. In one embodiment the system includes a plurality of sampling ports and a background port coupled to a console including a process controller. The console includes a vacuum maintenance manifold, and a separate sample manifold to which the sampling ports and background port are connected. The console further includes a helium mass spectrometer with a nitrogen purge supply, calibrated leak inputs, and a vacuum maintenance pump. The separate vacuum maintenance and sampling manifolds allow a constant flow from the gas sampling port to the sampling manifold, while continuous injection of the nitrogen gas into the sampling manifold prevents saturation of the mass spectrometer with helium from a tested part having excessive leakage.

24 Claims, 4 Drawing Sheets

MULTIPLE PORT LEAK DETECTION SYSTEM

CROSS REFERENCE TO RELATED APPLICATIONS

This application claims the benefit of prior U.S. provisional application No. 60/156,832 filed Sep. 30, 1999.

BACKGROUND OF THE INVENTION

This invention relates generally to systems and methods for leak detection in industrial applications, and more particularly to systems and methods for adapting mass spectrometry for leak detection in industrial high production applications.

In high production industrial systems such as, for example, refrigeration heat exchangers, power plants and missile piping, rapid and highly precise leak detection is necessary to insure system quality and safety. Many known leak detection systems employ the technique of helium mass spectrometry for detecting leaks and quantifying the rate of leakage. Typical leak detection systems using mass spectrometry use one of three known techniques.

The first technique is helium sniffing wherein a part under test is pressurized with helium and the environment surrounding the part monitored with a helium mass spectrometer probe. Some of the helium leaking through the part is captured in a gas sample by the probe and conducted to the mass spectrometer. The mass spectrometer then provides a quantitative value of the helium in the sample conducted to the mass spectrometer. However, this procedure produces a qualitative assessment of the leakage rate of the part under test because not all of the helium leaking from the part is conducted to the mass spectrometer. Nevertheless, with practice, an experienced operator can obtain results which parallel quantitative methods.

The second technique also involves pressurizing the part under test to with helium. However, the helium effluent, or leakage, escapes from the part to a closed container and the part can thus be pressurized to operating pressure. When the system reaches equilibrium, the environment of the closed container is then evacuated with a mass spectrometer and the effluent gas analyzed for helium content. Thus, all helium leaking from the part at equilibrium is captured by the system and analyzed by the mass spectrometer, so that the technique provides a quantitative assessment of the part leakage rate. Because the part can be pressurized to operating pressure, this technique provides the most accurate method of leak detection.

The third technique involves internally evacuating the part under test with the mass spectrometer while flooding a closed environment outside the part under test with helium. The mass spectrometer then measures the quantity of helium leaking into the part as a result of the pressure differential between the inside and outside of the part. This technique also provides a quantitative evaluation of the part leakage rate. The test results can be accurate when the part and test system are well calibrated to compensate for the pressure differential and the direction of leakage flow.

However, the use of mass spectrometry renders the leak detection process slow, and also requires a high level of skill from the operator. Furthermore, the technique is difficult to adapt to multiple sampling ports. In particular, the sampling chambers or test ports are often located at significant distances from the mass spectrometer itself. The increased time required for the gas sample to travel the distance to the mass spectrometer adversely affects the accuracy of the test results and decreases the sampling rate. In addition, sample gas frequently accumulates around the sampling port, thus rendering the sample inaccurate. Sometimes, a large bolus of helium from a part with excessive leakage reaches and then saturates the mass spectrometer, which will not be able to sample until cleared of the excess helium gas. This operation frequently takes several minutes to accomplish.

It would therefore be desirable to provide more rapid and high precision systems and methods adapting helium mass spectrometry for leak detection in industrial high production applications using multiple sampling ports. It would also be desirable to provide such systems and methods which reduce the skill level required of an operator. It would be further desirable to provide such systems and methods which reduce the occurrence of saturation of the mass spectrometer with helium gas. It would be still further desirable to provide such systems and methods which reduce flow problems at the sampling ports, so that the gas sample at the sampling port is always representative of the leakage. It would be yet still further desirable to provide such systems and methods which reduce test response time.

BRIEF SUMMARY OF THE INVENTION

These and other objects are attained by a high precision system for adapting mass spectrometry for leak detection in industrial high production applications. In one embodiment the system includes a plurality of sampling ports and a background port coupled to a console including a process controller. The console further includes a vacuum maintenance manifold and a separate sampling manifold to which the plurality of sampling ports and the background port are coupled through sampling port selection valves. The console further includes a helium mass spectrometer with calibrated leak inputs, vacuum maintenance pump, and nitrogen purge supply. The separate vacuum maintenance manifold allows a constant flow from the gas sampling ports to the console, while the calibrated leak inputs to the sampling manifold allow in process calibration and the nitrogen purge prevents saturation of the mass spectrometer with helium from a tested part having excessive leakage.

In another aspect, the invention relates to methods for high precision leak detection in high production industrial applications using helium mass spectrometry. In one embodiment the method includes the steps of using the leak detection system, including the steps of evacuating a test chamber containing parts under test, pressurizing the parts to operating pressure with helium gas, purging the system with a continuous flow of an inert gas, obtaining a sample of gas from the test chamber, and sending the gas sample to a helium mass spectrometer to determine an amount of helium in the gas sample.

The systems and methods provide improved adaptations of helium mass spectrometry for leak detection to industrial high production applications which have multiple sampling ports. The systems and methods allow for more rapid leak detection by facilitating sampling from multiple sample ports. Further, the systems and methods reduce the skill level required of an operator by reducing saturation of the mass spectrometer and by reducing sampling error introduced by flow problems at the sampling ports. In addition, the systems and methods improve the precision of test results by improving sample accuracy.

DETAILED DESCRIPTION OF THE INVENTION

Figure 1:
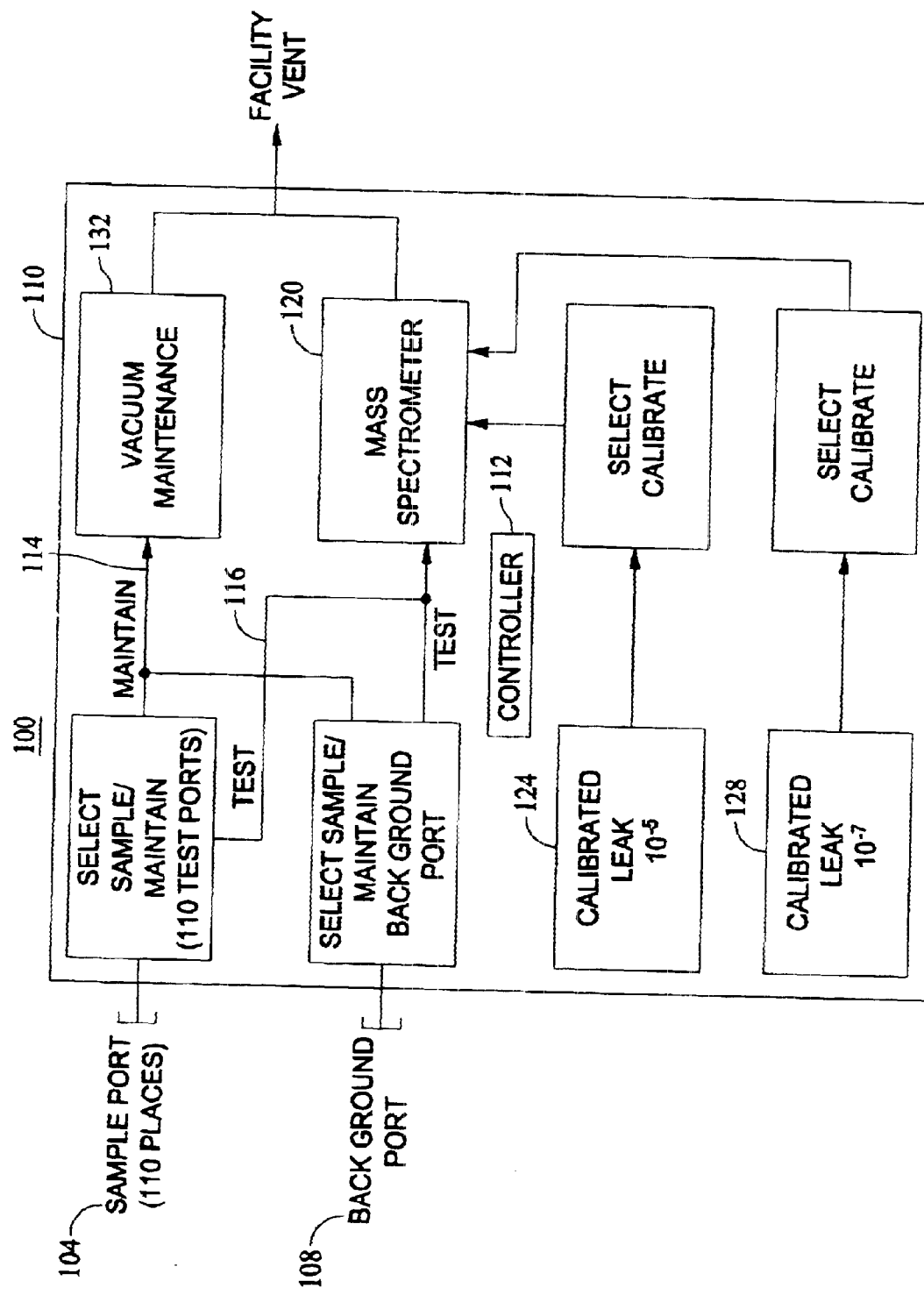
FIG. 1 is a block diagram of a multiple port leak detection system.

FIG. 1 is a block diagram of one embodiment of a leak detection system 100. In the one embodiment, system 100 includes a plurality of sampling ports 104 and a background port 108 coupled to a console 110. Console 110 includes a process controller 112 or other stepping mechanism which controls the flow of gas samples through system 100. Process controller 112 is, for example, a programmable circuit or computer device. Program controller 112 is programmed to run the leak test sequence. Console 110 further includes a vacuum maintenance manifold 114 and a separate sample manifold 116 both coupled to each sampling port 104 and background port 108. Console 110 also includes a helium mass spectrometer 120 having two different calibrated leak inputs 124 and 128, mass spectrometer 120 coupled to sample manifold 116, and a vacuum maintenance pump 132.

Figure 2:
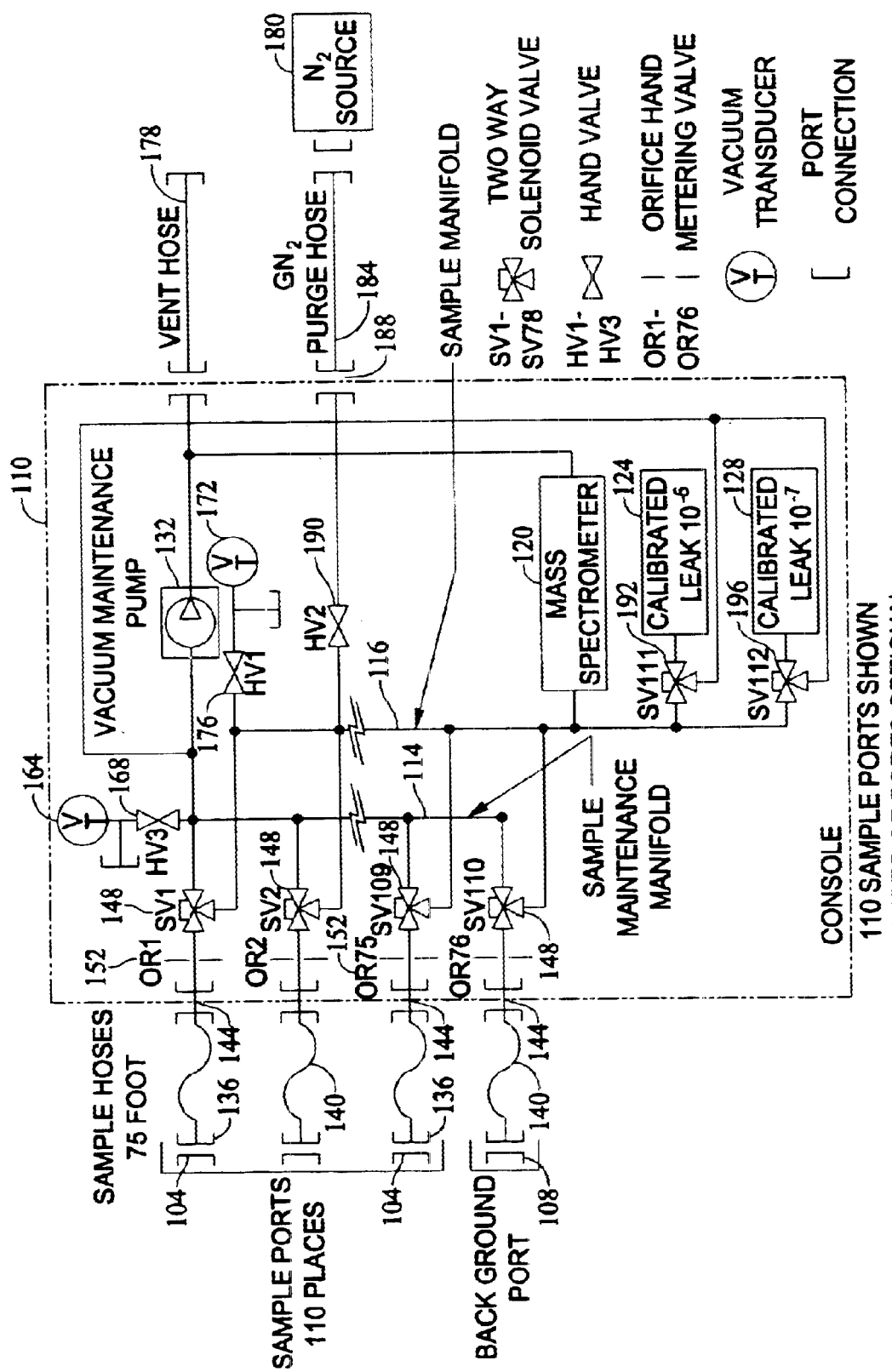
FIG. 2 is a fluid schematic diagram of the multiple port leak detection system.

FIG. 2 is a fluid schematic diagram of the embodiment of leak detection system 100 as shown in FIG. 1. In the one exemplary embodiment, sampling ports 104 number one hundred ten, but of course this number may widely vary depending on the industrial application of leak detection system 100. Sampling ports 104 and background port 108 are coupled by port connections 136 to sample hoses 140, which are in turn coupled to console 110 by port connections 144. In an exemplary embodiment, sample hoses 140 are about seventy-five feet in length, though of course the length may vary. Each port connection 144 is in turn coupled to a two-way solenoid valve 148. Between each port connection 144 and solenoid valve 148 is vacuum maintenance manifold 114 and a second output to a sample manifold 116. A first vacuum transducer 164 is coupled to vacuum maintenance manifold 114 with a first hand valve 168 interposed therebetween, and a second vacuum transducer 172 is coupled to sample manifold 116 with a second band valve 176 interposed therebetween. Vacuum maintenance pump 132 is connected to vacuum maintenance manifold 114. A vent hose 178 is further coupled to console 110 as shown in FIG. 2.

An inert gas source 180 is coupled via a purge hose 184 and port connection 188 to sample manifold 116, with a third hand valve 190 interposed between gas source 180 and sample manifold 116. In one embodiment gas source 180 contains $N_2$, but in alternative embodiments contains another inert gas having a molecular weight greater than $He_2$. Helium mass spectrometer 120 is coupled to sample manifold 116. Inputs from first calibrated leak input 124 and second calibrated leak input 128 to mass spectrometer 120 are controlled respectively by two-way solenoid valves 192 and 196. Calibrated leak inputs 124 and 128 provide, for example, known leakage rate inputs that differ by about two log units. Referring again to FIG. 1, an exemplary first calibrated leak input is $10^{-5}$ standard cubic centimeters per second (sccs) helium, while an exemplary second calibrated leak input is $10^{-7}$ sccs helium.

In use, system 100 is transported or installed at an industrial production plant to be tested for leaks. Program controller 112 is programmed to run the test sequence by controlling the position of the valves in system 100. In an alternative embodiment, the test sequence is accomplished through manual switching. background helium level is measured from a sample at background port 108 and in one embodiment process controller 112 deducts the background level of helium from any measured leakage. Because of separate vacuum maintenance manifold 114, system 100 can provide dynamic sampling and more rapid test response. Gas being sampled is maintained in a continuous flow along sampling manifold 116 so that gas does not collect around sampling ports 104.

Figure 3:
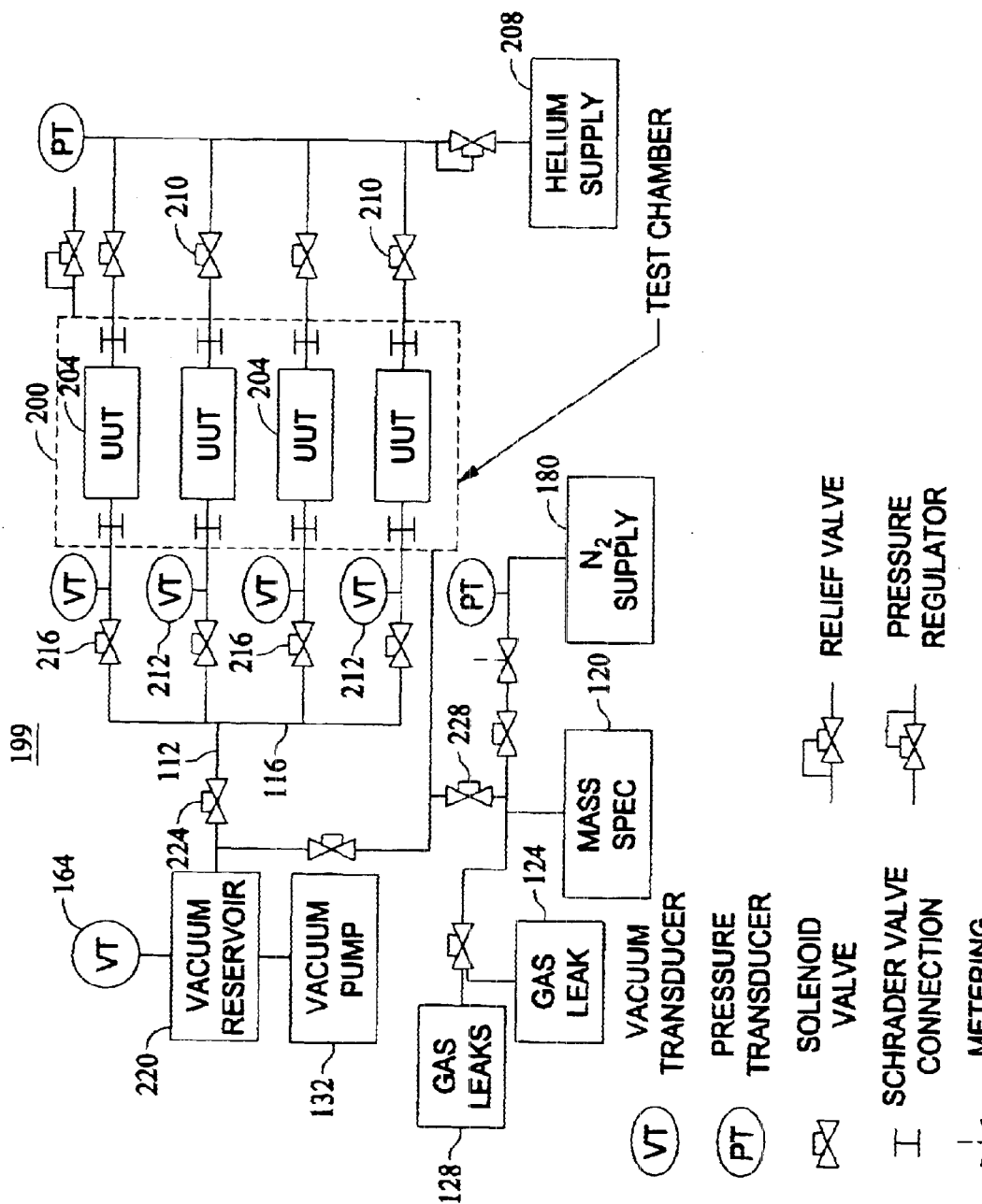
FIG. 3 is a fluid schematic of a pressurized part leak detection system.
Figure 4:
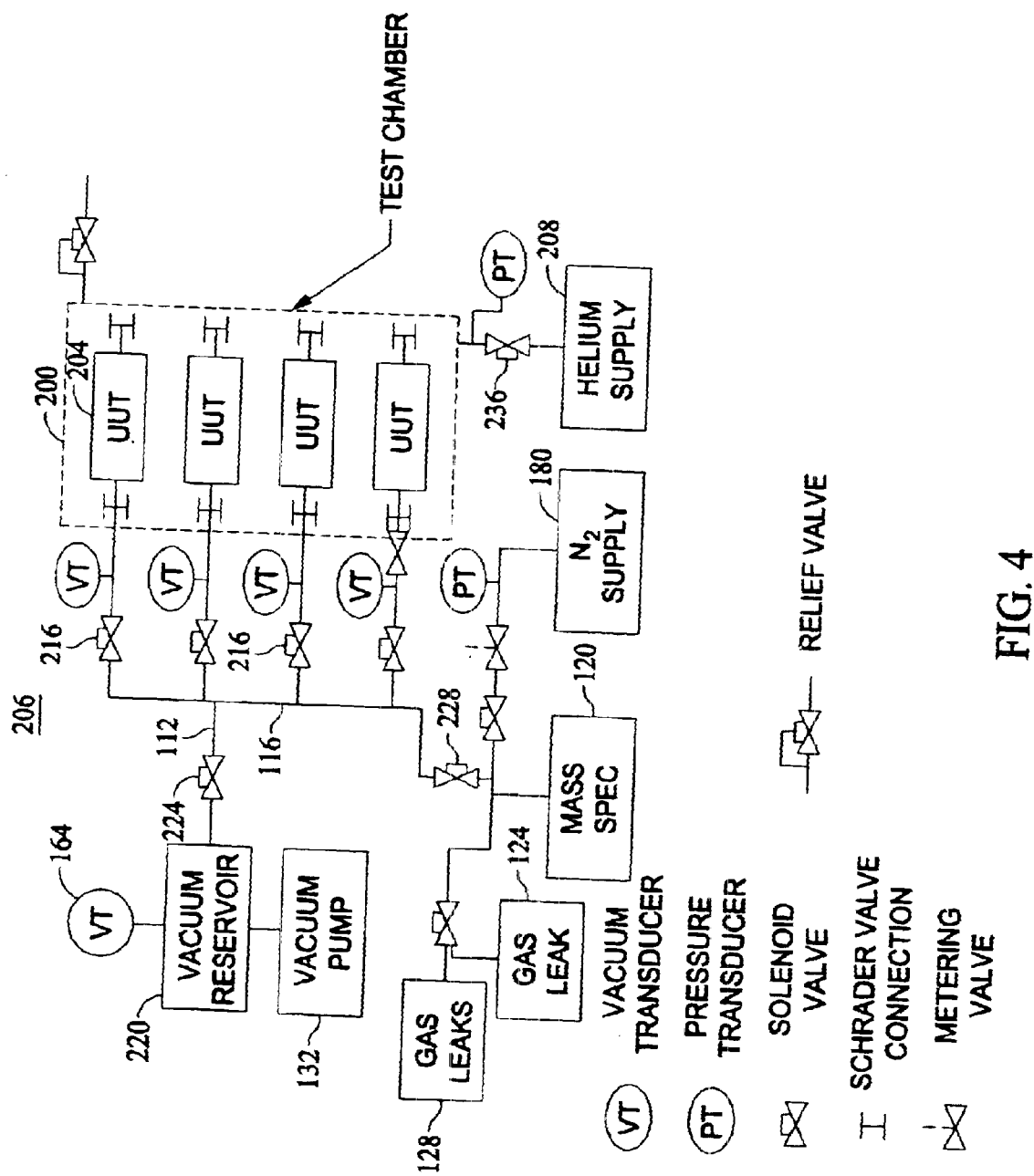
FIG. 4 is a fluid schematic diagram of an evacuated part leak detection system.

FIGS. 3 and 4 show two alternative embodiments of leak detection system 100. FIG. 3 is transported or installed at an industrial production plant to be tested for leaks. System 100 is connected to a test chamber 200 including multiple parts or units 204 under test (UUT). More specifically, sampling ports 104 and background port 108 are coupled to test chamber 200 via sampling hoses 140. In operation, vacuum maintenance pump 132 maintains a vacuum on the fluid circuit, drawing gas samples through system 100. Background port 108 monitors the background level of helium in test chamber 200 or other area under test. The background level of helium is later subtracted from the parts leakage rate as determined by mass spectrometer 120 to obtain an accurate measure of actual leakage from parts 204 under test.

Process controller 112 controls the flow of gas samples from test chamber 200 by controlling the position of two-way solenoid valves 148. Under the non-test condition, for example between periods of leakage testing, two-way solenoid valves 148 are open to or vacuum maintenance manifold 114 and the gas samples from sampling ports 104 are vented through vent hose 178 to the facility. Under the non-test condition, system 199 can also be automatically calibrated. For automatic system calibration, process controller 112 controls the position of two-way solenoid valves 192 and 196 so that one of calibrated leak inputs 124 or 128 is open to mass spectrometer 120. Mass spectrometer 120 is then calibrated accordingly. Nitrogen gas from nitrogen source 180 is run continuously at a low known level to purge system 199 and thus reduce the risk of saturation of mass spectrometer with helium from leaking parts. The dilution of the sample by the low level $N_2$ purge is compensated by the calibrated leak inputs 124 and 128. Thus, system 199 is continuously calibrated to compensate for the continuous nitrogen purge input. The nitrogen purge and calibration is also believed to provide more accurate test results.

FIGS. 3 and 4 show two alternative embodiments of leak detection system 100. The embodiments shown in FIGS. 3 and 4 pre-screen the parts under test for parts which exhibit gross leakage, and such parts are isolated from further testing with helium. These embodiments are especially suitable for applications which require or need to conserve the amount of helium used for testing and reduce the risk of saturation of the mass spectrometer. The pre-screening also speeds up the testing process by eliminating gross leakers. More specifically, either vacuum decay or pressure decay pre-screening is used to screen for gross leakage as follows. For example, pressure decay pre-screening proceeds as follows. Before helium is sprayed into system 100 for testing, a part under test 204 in test chamber 200 is pressurized with nitrogen gas or air and a pressure decay function determined to indicate if that part 204 exhibits gross leakage. If so, that part 204 is isolated from further testing with helium using either a pressurized part leak detection system or an evacuated part leak detection system, both as described below. Alternatively, a part 204 under test is evacuated and the resulting vacuum decay function indicates any gross leakage.

More specifically, FIG. 3 is a fluid schematic of an alternative embodiment of leak detection system 100. In this embodiment, parts are tested using a pressurized part, evacuated chamber method. Test chamber 200 is under vacuum and parts 204 in test chamber 200 are pressurized internally with helium gas from a helium source 208 coupled by solenoid valves 210 to each part under test 204. Nitrogen supply 180 is included to supply a continuous nitrogen purge as described above. In one embodiment, the system also includes calibrated leak inputs 124 and 128 as described above. Each part 204 under test is coupled to sampling manifold 116 through a vacuum transducer 212 and a one-way solenoid valve 216. Process controller 112 controls the position of solenoids 216 so that the gas sample is directed to sample manifold 116 and then to mass spectrometer 120. Mass spectrometer 120 then measures the total amount of helium leaking from all parts 204 under test. If the leakage rate for all parts 204 under test is below a predetermined acceptable level for a single part, then the group of parts 204 in test chamber 200 are accepted. If, however, the leakage rate for all parts 204 under test is above a predetermined acceptable level for a single part, then each individual part 204 in chamber 200 must be isolated and tested to determine which part or parts have unacceptable leakage. This is accomplished by the process controller 112 controlling the position of solenoid valves 216 so that each part 204 is sequentially and individually evacuated. Mass spectrometer 120 then determines the individual part leakage rate by determining the reduction in overall leakage rate attributable to each part 204.

To reduce the amount of time required to sequentially evacuate each part 204 under test, in one embodiment system 100 includes a vacuum reservoir 220 interposed between vacuum pump 132 and a vacuum transducer 222. Vacuum reservoir 220 is coupled to sample manifold 116 through a one-way solenoid valve 224. Vacuum reservoir 220 is maintained under a vacuum at all times and parts 204 which are to be evacuated are ducted to reservoir 220 through sample manifold 116 by process controller 112 controlling the position of solenoid valve 224. Gas source 180, typically containing nitrogen gas, is coupled to the output of sample manifold 116 through a one-way solenoid valve 228. Nitrogen, or another suitable gas, is injected continuously into sample manifold 116 to prevent a high level of helium from saturating mass spectrometer 120 in case of a high leakage rate from a part 204 under test.

FIG. 4 is a fluid schematic of an alternative embodiment of leak detection system 100. In this embodiment, parts are tested using an evacuated part, flooded chamber method. The system in FIG. 4 includes nitrogen supply 180 to supply a continuous nitrogen purge as described above. Similar to the evacuated chamber system as described above, system 100 includes vacuum reservoir 220 which is maintained under vacuum at all times. However, in contrast with the evacuated chamber method as described above, helium source 208 is coupled directly to test chamber 200 via a solenoid valve 236 which is subject to control by process controller 112. To test for leakage of parts 204, gas samples from parts 204 are ducted through valves 216 to sample manifold 116 and evacuated by vacuum reservoir 220. Helium source 208 sprays helium into chamber 200 so that parts 204 are surrounded by helium. Leakage of helium into parts 204 then reflects the leakage rate, and the amount of helium leaking into parts 204 is quantified by mass spectrometer 120. In alternative embodiments of system 100 as shown in FIGS. 3 and 4, background helium level monitoring as described for FIG. 1 are also incorporated.

It is believed that the leak detection system and methods provide improved application of helium mass spectrometry to leak detection in high production industrial applications such as refrigeration systems, missile piping and power plants where time and accuracy are at a premium. Use of separate manifolds for vacuum maintenance and sampling, and use of a vacuum reservoir, speeds the process of leak detection by allowing rapid evacuation. Further, the use of separate manifolds allows the leak detection system to maintain a constant flow of gas being sampled so that the problem of gas accumulation around sampling ports is minimized. It is therefore believed that the system results in gas samples which more accurately reflect actual part leakage. Further, continuous but compensated purge injection of an inert gas, such as nitrogen gas, prevents saturation of the mass spectrometer and avoids the associated lost time.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed:

1. A multiple port leak detection system comprising:
   a console comprising a stepping mechanism controlling a plurality of sampling port valves, a vacuum maintenance manifold, a sample manifold and a helium mass spectrometer coupled to said vacuum maintenance manifold and to said sample manifold;
   a plurality of sampling ports, each said sampling port alternately coupled to said vacuum maintenance manifold and to said sampling manifold through the plurality of sampling port selection valves; and
   a background port coupled to said vacuum maintenance manifold and to said sampling manifold, said system determining a leak rate by subtracting a background level of helium as determined utilizing said background port from a leakage rate as determined utilizing said sampling ports.

2. A multiple port leak detection system in accordance with claim 1 wherein said console further comprises a plurality of calibrated leak inputs coupled to said helium mass spectrometer.

3. A multiple port leak detection system in accordance with claim 2 wherein said plurality of calibrated leak inputs comprises a first calibrated leak input and a second calibrated leak input.

4. A multiple port leak detection system in accordance with claim 3 wherein said first calibrated leak input is configured to provide a first calibrated leak, said second calibrated leak input is configured to provide a second calibrated leak, the second calibrated leak differing by about two log units from the first calibrated leak.

5. A multiple port leak detection system in accordance with claim 4 wherein said first calibrated leak is configured to provide the first calibrated leak at about $10^{-5}$ standard cubic centimeters per second helium, and said second calibrated leak input is configured to provide the second calibrated leak at about $10^{-7}$ standard cubic centimeters per second helium.

6. A multiple port leak detection system in accordance with claim 2 further comprising an inert gas source coupled to said sample manifold.

7. A multiple port leak detection system in accordance with claim 6 wherein said inert gas source contains a gas having a molecular weight greater than helium.

8. A multiple port leak detection system in accordance with claim 2 further comprising a gas source which contains nitrogen gas.

9. A multiple port leak detection system in accordance with claim 1 wherein said stepping mechanism for controlling the flow of gas through said leak detection system comprises a process controller.

10. A multiple port leak detection system in accordance with claim 9 wherein said process controller comprises a computer device.

11. A multiple port leak detection system in accordance with claim 9 wherein said process controller comprises a programmable circuit.

12. A multiple leak port detection system in accordance with claim 1 further comprising a plurality of solenoid valves, a portion of said valves are configured to couple said sampling ports to said vacuum maintenance manifold and to said sampling manifold, another portion of said valves are configured to couple said background port to said vacuum maintenance manifold and to said sampling manifold.

13. A leak detection system for detecting leaks in applications involving multiple sampling ports, said leak detection system comprising:
  a console for collecting gas samples from an application being tested, said console comprising a stepping mechanism controlling a plurality of sampling port selection valves;
  a plurality of sampling ports for collecting a plurality of gas samples from the application being tested; and
  a background port for collecting a background gas sample from the application being tested, said console further comprising a vacuum maintenance manifold and a separate sample manifold, said vacuum maintenance manifold and said sampling manifold alternately coupled to said sampling ports through the plurality of sampling port selection valves and to said background port, said vacuum maintenance manifold and said sampling manifold further coupled to a helium mass spectrometer, said sampling manifold configured to provide a continuous flow of the gas samples to the helium mass spectrometer, said system determining a leak rate by subtracting a background level of helium as determined utilizing said background port from a leakage rate as determined utilizing said sampling ports.

14. A leak detection system in accordance with claim 12 wherein said stepping mechanism comprises a process controller.

15. A leak detection system in accordance with claim 12 wherein said console further comprises a plurality of calibrated leak inputs coupled to said helium mass spectrometer.

16. A leak detection system in accordance with claim 15 wherein said plurality of calibrated leak inputs comprises a first calibrated leak input and a second calibrated leak input.

17. A leak detection system in accordance with claim 16 wherein said first calibrated leak input is configured to provide a first calibrated leak, said second calibrated leak input is configured to provide a second calibrated leak, the second calibrated leak differing by about two log units from the first calibrated leak.

18. A leak detection system in accordance with claim 12 further comprising an inert gas source coupled to said sample manifold.

19. A leak detection system in accordance with claim 18 wherein said inert gas source contains a gas having a molecular weight greater than helium.

20. A leak detection system in accordance with claim 18 wherein said inert gas source is configured to provide a continuous level of inert gas flow to said mass spectrometer.

21. A leak detection system in accordance with claim 13 further comprising a gas source which contains nitrogen gas.

22. A leak detection system in accordance with claim 13 further comprising a plurality of solenoid valves, a portion of said valves are configured to couple said sampling ports to said vacuum maintenance manifold and to said sampling manifold, another portion of said valves are configured to couple said background port to said vacuum maintenance manifold and to said sampling manifold.

23. A method of leak detection utilizing a multiple port leak detection system including a plurality of sampling ports for collecting gas samples from a test chamber, a background port for collecting a background sample from the test chamber, a vacuum maintenance manifold, a separate sample manifold, the vacuum maintenance manifold and sample manifold alternately coupled to a plurality of sampling port selection valves, the vacuum maintenance manifold and sampling manifold coupled to a helium mass spectrometer, the sampling manifold configured to provide a continuous flow of the gas samples to the helium mass spectrometer, said method comprising:
  evacuating the test chamber containing the parts being tested in the application;
  pressurizing the parts being tested to operating pressure with helium gas;
  purging the leak detection system with a continuous flow of inert gas to the mass spectrometer;
  providing a first calibrated leak input to the helium mass spectrometer and a second calibrated leak input to the helium mass spectrometer, the second calibrated leak input differing by about two log units from the first calibrated leak input;
  collecting a plurality of gas samples from the plurality of sampling ports in the test chamber; and
  sending the gas samples in a continuous flow to the helium mass spectrometer to determine an amount of helium in the gas samples, based on an amount of helium in the background sample.

24. A method of leak detection in accordance with claim 23 further comprising the step of using the first calibrated leak input and the second calibrated leak input to compensate for the continuous flow of inert gas purging the helium mass spectrometer.

* * * * *

UNITED STATES PATENT AND TRADEMARK OFFICE
CERTIFICATE OF CORRECTION

PATENT NO. : 6,629,043 B1
DATED : September 30, 2003
INVENTOR(S) : Jere Poteat

It is certified that error appears in the above-identified patent and that said Letters Patent is hereby corrected as shown below:

Column 7,
Lines 48 and 51, delete "12" and insert therefor -- 13 --.

Column 8,
Line 5, delete "12" and insert therefor -- 13 --.

Signed and Sealed this

Twelfth Day of April, 2005

JON W. DUDAS
*Director of the United States Patent and Trademark Office*